United States Patent [19]

Izumi

[11] 4,417,503

[45] Nov. 29, 1983

[54] CYLINDER DEVICE

[75] Inventor: Shinichi Izumi, Yokohama, Japan

[73] Assignee: Tokico Ltd., Kawasaki, Japan

[21] Appl. No.: 175,860

[22] Filed: Aug. 6, 1980

Related U.S. Application Data

[63] Continuation of Ser. No. 933,318, Aug. 21, 1978, abandoned.

[30] Foreign Application Priority Data

Aug. 20, 1977 [JP] Japan ................................ 52-111671

[51] Int. Cl.$^3$ ................................................ F16J 9/20
[52] U.S. Cl. ........................................ 92/240; 277/205
[58] Field of Search ................... 277/212 C, 213, 208, 277/205; 92/240, 243; 60/533

[56] References Cited

U.S. PATENT DOCUMENTS

| 2,442,650 | 6/1948 | Hoffman et al. | 92/243 |
| 2,489,715 | 11/1949 | Mark, Jr. et al. | 277/212 |
| 3,144,256 | 8/1964 | Wright | 277/208 |
| 3,266,385 | 8/1966 | Scaramucci | 92/240 X |

FOREIGN PATENT DOCUMENTS

| 1107074 | 8/1965 | France | 92/24 D |
| 547171 | 8/1942 | United Kingdom | 92/243 |

Primary Examiner—Gerald A. Michalsky
Attorney, Agent, or Firm—Wenderoth, Lind & Ponack

[57] ABSTRACT

A cylinder device including a piston working in a cylinder and partitioning the interior of the cylinder into an oil space and an air space, and a seal in the form of a molded packing ring such as a U-packing or U-cup packing mounted on the piston to seal the oil space from the air space. An additional lip is formed on the seal in addition to a conventional annular lip and is spaced from the conventional lip in the direction toward the air space and is angled toward the air space.

2 Claims, 5 Drawing Figures

CYLINDER DEVICE

This application is a continuation of application Ser. No. 935,318, filed Aug. 21, 1978, now abondoned.

BACKGROUND OF THE INVENTION

This invention relates to a cylinder device and, more particularly, to improvements in a seal for the piston of the cylinder device for effecting good sealing characteristics during normal usage and also during a vacuum oil-filling operation.

In a conventional hydraulic cylinder device such as a master cylinder or the like, a piston is slidably fitted in a cylindrical bore formed in a main body of the cylinder device to partition the interior of the bore into an oil space and an air space, and a seal in the form of a molded packing ring such as a U-packing or a U-cup packing is fitted on the piston with a lip portion thereof being located adjacent to and angled toward the oil space and engaging with the inner periphery of the bore to seal the oil chamber from the air space.

In a modified form, an additional lip is formed on or adjacent the end toward the air space to improve the sealing characteristics of the seal. The additional lip is spaced from the first mentioned lip in the direction of the axis of the bore and is also angled toward the oil space and normally the first mentioned lip in the direction of the axis of the bore and is also angled toward the oil space and normally engaged with the bore thus augmenting the sealing characteristics of the first mentioned lip and, further, additional lip is effective to prevent the seal from being subjected to the so-called rolling phenomenon.

Such a seal acts satisfactorily in the usual operating conditions.

However, there has been proposed a process for filling hydraulic liquid into a newly assembled hydraulic system of a vehicle, wherein the interior of the hydraulic system including various components and pipe lines is firstly evacuated to a high vacuum and, thereafter, hydraulic liquid is supplied into the system thus eliminating troublesome air-bleeding operations, and such a filling operation is usually referred to as a vacuum oil-filling operation.

The conventional lip type seal is not effective in a vacuum oil-filling operation, since the high vacuum prevailing in the oil space tends to rollingly move the seal toward the oil chamber to separate the lip from the wall of the bore, because the lip is angled toward the oil space to act against high pressure in the oil chamber and, moreover, the pressure difference acting across the seal in the high vacuum condition is in the opposite direction to the normal pressure difference.

SUMMARY OF THE INVENTION

An object of the present invention is to provide a cylinder device having a cylinder, a piston working in the cylinder, and a seal in the form of a molded packing ring such as a U-packing or a U-cup packing fitted between the cylinder and the piston, and the seal is formed to have two annular lips spaced in the direction of the axis of the cylinder with one located toward the inside of the cylinder and angled toward the inside of the cylinder and normally slidably engaging the surface of the cylinder engaged by the piston and the other located toward the outside of the cylinder and being angled toward the outside of the cylinder.

BRIEF DESCRIPTION OF THE DRAWINGS

This invention will be explained hereinafter in detail with reference to the accompanying drawings, in which.

Figure 1:
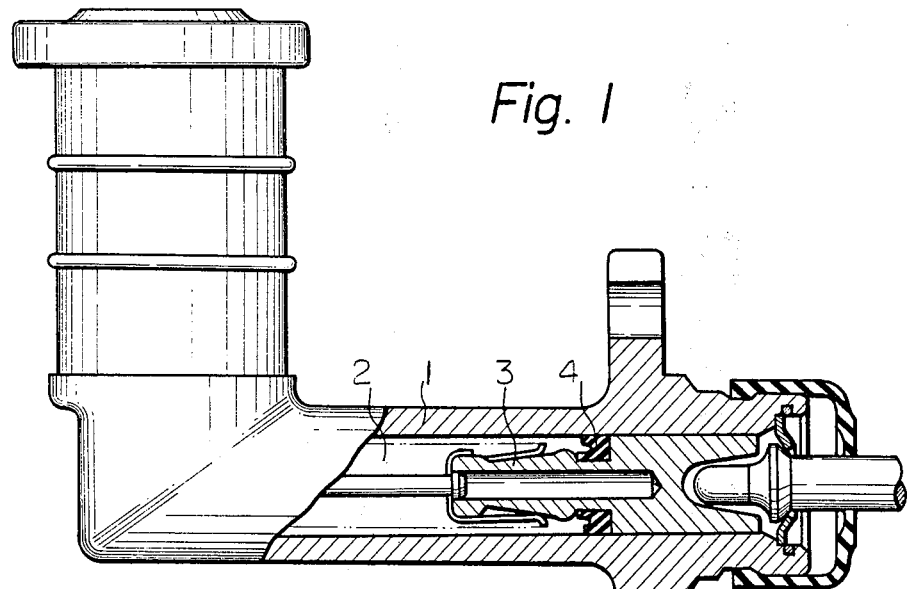
FIG. 1 is a longitudinal sectional view of a cylinder device of the type to which the present invention is directed.

DETAILED DESCRIPTION OF THE INVENTION:

The cylinder device shown in FIG. 1 comprises a cylinder body 1 having slidably positioned therein a piston 3 defining an oil space 2 in the cylinder 1, and a seal or U-packing 4 fitted in a recess (unnumbered) in the piston 3 for sealing oil tightly in the oil space 2 from the space outside the cylinder or the atmosphere.

Figure 2:
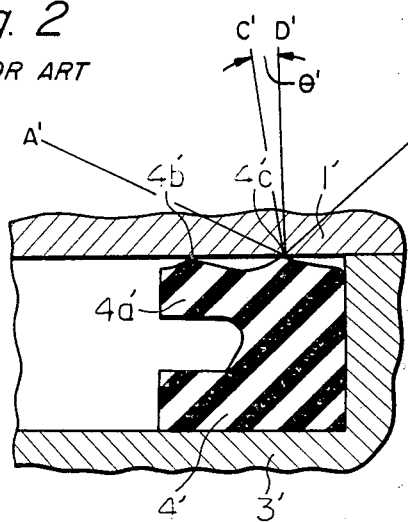
FIG. 2 is an enlarged partial view similar to FIG. 1 but showing a seal of the prior art.

FIG. 2 shows a modified form of a conventional U-packing having two annular lips 4'b and 4'c on the outer circumference thereof. It will be noted that the lip 4'c is not provided on a conventional U-packing. The lips 4'b and 4'c are angled at an angle $\theta'$ toward the oil space 2 in the cylinder (leftward in FIG. 2) so as to withstand the high pressure prevailing in the oil space 2 and to prevent oil in the oil space from leaking to the outside or in the rightward direction across respective lips. The angle $\theta'$ is the angle between a bisector C' of the angle formed by the surfaces of the lip 4'c and a perpendicular D' to the axis of the packing. In FIG. 2 the angle A'OB' is formed between lines extending from the surfaces of the lips 4'C, and this is the same as the angle of the cross-section of the lip. The lip 4'c improves or augments the sealing characteristics of the lip 4'b, but the lip 4'c will sometimes break the oil film formed on the inner wall of the cylinder, thus, causing sticking of the seal 4'. In the drawing, 1' designates the cylinder body, and 3' designates the piston.

Figure 3:
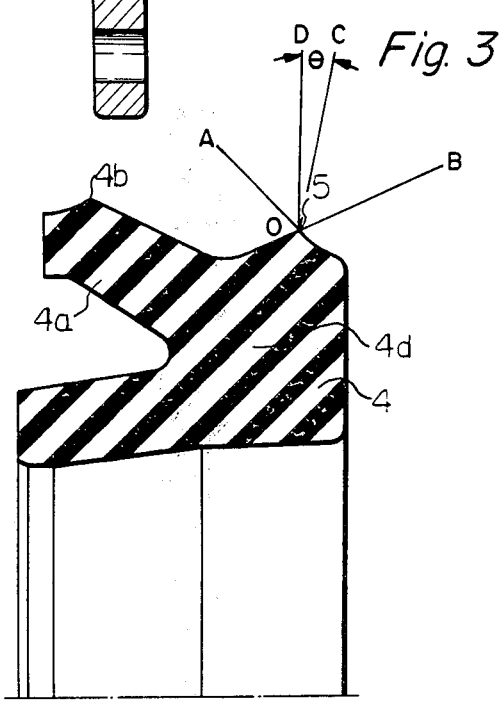
FIG. 3 is an enlarged sectional view of the seal according to the present invention.
Figure 4:
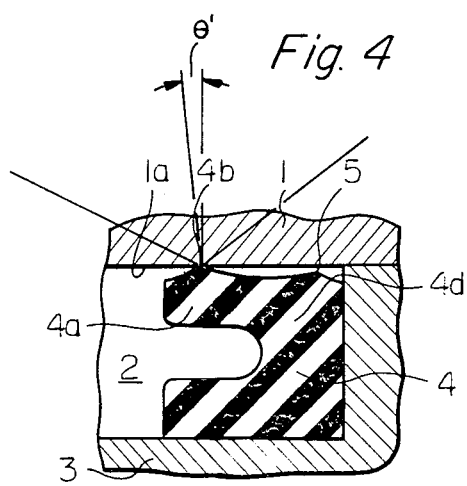
FIG. 4 is an enlarged partial view of FIG. 1 showing the seal of FIG. 3 in assembled condition and under normal pressure conditions.
Figure 5:
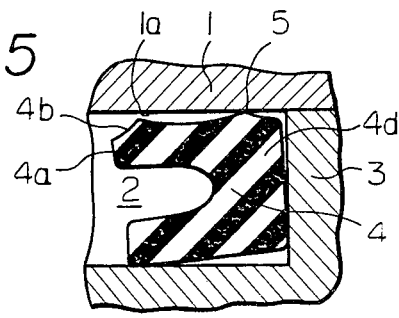
FIG. 5 is a view similar to FIG. 4 but showing the seal during a vacuum oil-filling operation.

In FIGS. 3–5, the seal 4 according to the invention comprises a lip 4b which is similar to the lips of the conventional U-packing (located adjacent to the oil space and angled toward the oil space at an angle $\theta'$), and another or additional lip 5. The lip 5 is spaced from the lip 4b in the direction of the axis of the cylinder and located adjacent to the end remote from the oil space, i.e. the outer end of the seal, and is angled toward the outside (the opposite direction relative to the lip 4b) at an angle $\theta$, which is the angle between the bisector D of the angle AOB of the lip profile and the perpendicular C. Preferably, the diameter of the lip 5 is slightly smaller than the inner diameter of the cylinder.

During a vacuum oil-filling operation, when a high vacuum is applied to the oil space 2, the seal 4 rolls from a first position as shown in FIG. 4 in the counterclockwise direction in the drawing to a second position as shown in FIG. 5 and the lip 5 will contact the inner wall 1a and effectively seal the oil space 2 from atmospheric pressure prevailing on the outside of the cylinder since the lip 5 is angled toward the outside.

The lip 5 may contact the inner wall 1a in the normal operating condition, but since the lip 5 is angled toward the outside, the oil film formed on the inner wall 1a will not be wiped off by the lip 5 to any great degree during the inward (leftward in the drawing) movement of the piston, and thus it is possible to prevent excessive wear or rupture of the seal which would be caused by breakage of oil film.

I claim:

1. A cylinder device comprising a main body having a bore, a piston slidably fitted in the bore to partition the interior of the bore into an oil space having oil therein and an air space communicating with the atmosphere, said piston having a peripheral recess therein for receiving a packing, and a U-packing or U-cup packing type seal fitted in said peripheral recess in the piston in a normally unstressed condition to seal the oil space from the air space, said seal having the open end of the U-shape facing the oil space, said seal having an annular lip on the outside of the outer leg of the seal adjacent to the oil space and the outermost portion thereof having a diameter larger than the inside diameter of said bore and engaging the inner wall of the bore in sealing relationship therewith, and an additional lip on the outside of the outer leg of the seal at a location spaced from the firstmentioned lip in the direction toward the air space and the outer periphery of said seal between said lips having a diameter less than the diameter of said bore, said seal being movable between a first position in which said seal is seated with the inner peripheral surface firmly against the outer peripheral surface of said piston in said recess, in which first position said annular lip is in sealing contact with the inner periphery of said bore and said additional lip is spaced from the inner periphery of said bore, said first position being the position of said seal when a differential pressure is present across said seal with the higher pressure on the oil space side, and a second position in which said seal is rolled toward said oil space and part of the inner periphery separates from the outer peripheral surface of said piston in said recess, in which second position said additional lip is in sealing contact with the inner periphery of said bore, said second position being the position of said seal when a differential pressure exceeding a predetermined pressure is present across said seal with the higher pressure on the air space side thereof.

2. A cylinder device as claimed in claim 1 in which said annular lip is angled toward the oil space, and said additional lip is angled toward the air space.

* * * * *